UNITED STATES PATENT OFFICE.

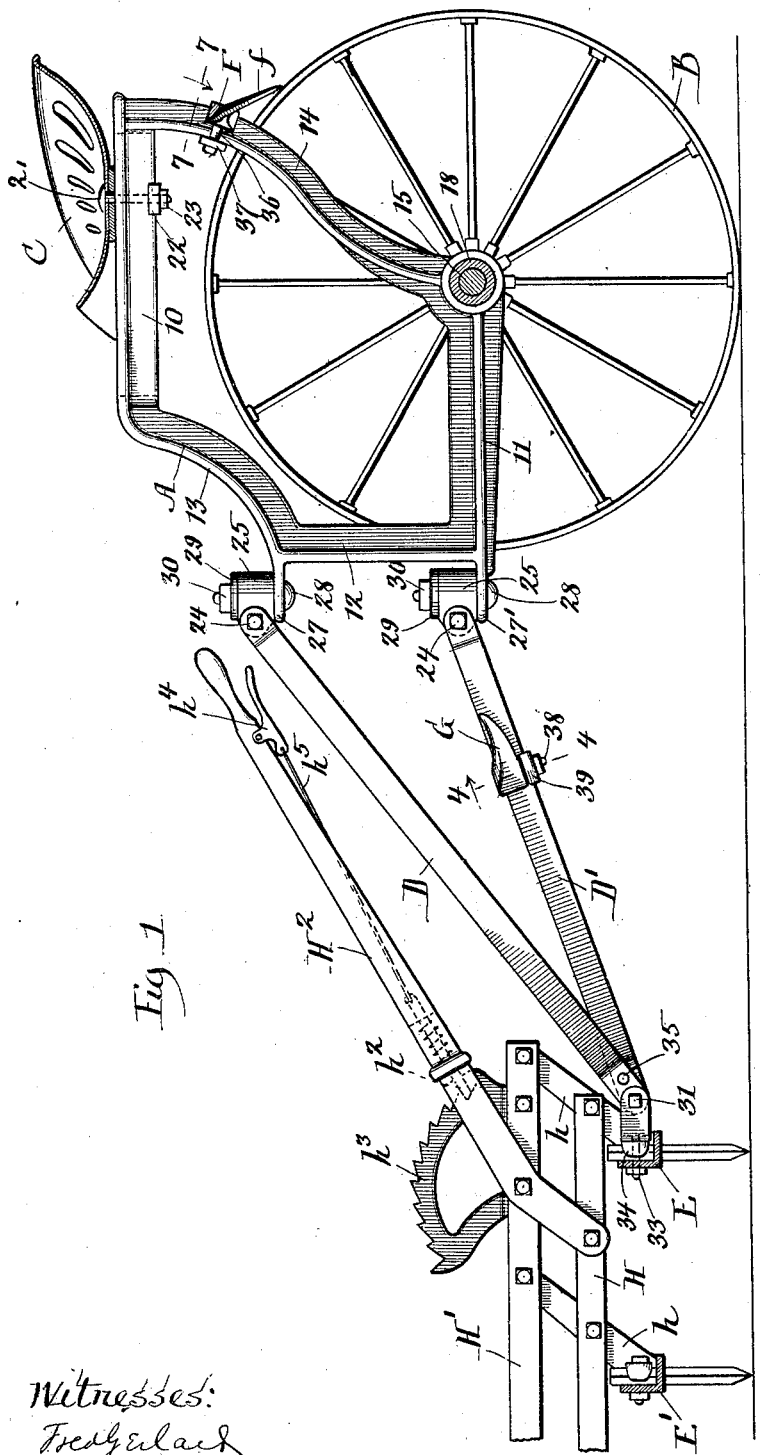

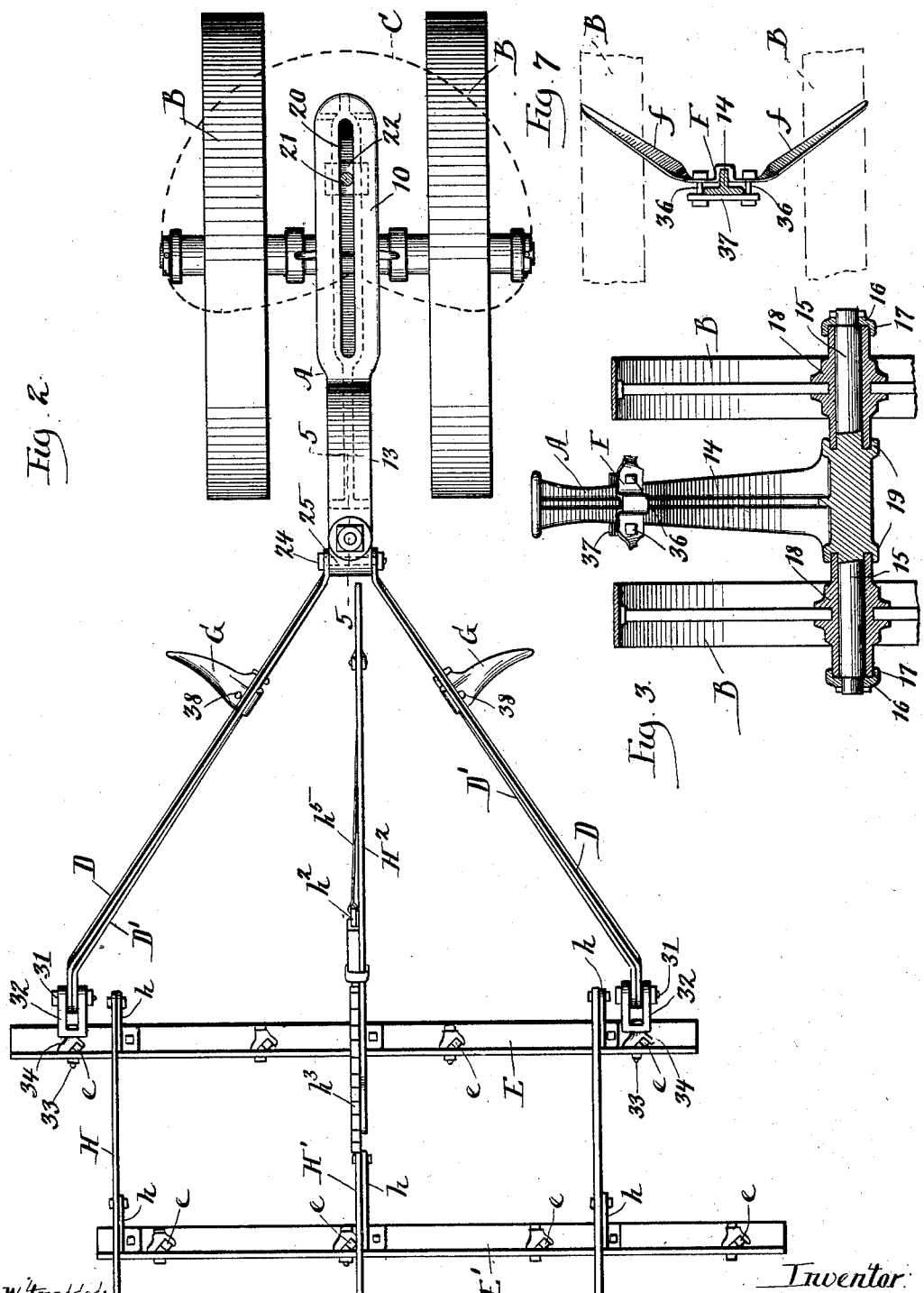

JOSEPH MANGAN, OF GALESBURG, ILLINOIS.

RIDING ATTACHMENT FOR HARROWS.

SPECIFICATION forming part of Letters Patent No. 718,852, dated January 20, 1903.

Application filed June 4, 1902. Serial No. 110,155. (No model.)

*To all whom it may concern:*

Be it known that I, JOSEPH MANGAN, a citizen of the United States, and a resident of Galesburg, county of Knox, and State of Illinois, have invented a certain new and useful Riding Attachment for Harrows, of which the following is declared to be a full, clear, and exact description.

The invention relates to a riding attachment for toothed harrows and the like, and seeks to provide a simple and convenient attachment mounted upon supporting-wheels and carrying a driver's seat, which may be readily and easily connected to a harrow-section or to one of several sections connected together.

The invention consists in the features of construction, arrangement, and combinations of parts set forth in the following description, illustrated in the accompanying drawings, and more particularly pointed out in the appended claims.

In the drawings, Figure 1 is a side elevation of the improved riding attachment as connected to a harrow-section with one of the wheels removed and the seat shown in cross-section. Fig. 2 is a plan view of the same, the seat being shown in dotted lines. Fig. 3 is a rear view of the wheel-frame, the hub and wheels being shown in section. Fig. 4 is a detail section on line 4 4 of Fig. 1, showing the manner of adjustably securing the foot-rest in place. Fig. 5 is a detail section on line 5 5 of Fig. 2, illustrating the pivot-joint between the wheel-frame and the connecting brace rods or links. Fig. 6 is a detail plan view, partially in section, of the coupling connection between the connecting brace-rods and the harrow-frame. Fig. 7 is a detail section on line 7 7 of Fig. 1, illustrating the adjustable scrapers for the wheels.

The wheel-frame A of the attachment is extremely narrow and arranged in upright position, as shown. This frame preferably comprises the upper and lower horizontal members 10 and 11, the front vertical member 12 rising from the forward end of the lower horizontal member 11, and the substantially parallel front and rear inclined members 13 and 14, as shown. If desired, the members of the wheel-frame may be formed in separate pieces, but preferably, as indicated in the drawings, they are all cast in piece and provided with central vertically-disposed strengthening-ribs.

The lower rear corner of the wheel-frame is provided with the horizontally-projecting journals 15, which are preferably, as indicated, cast in piece with the wheel-frame. The supporting-wheels B are mounted to revolve upon the journals 15 on each side of the wheel-frame A and are held in place by cap-pieces 16, which are pinned upon the outer reduced end portions of the journals 15.

To exclude dirt, (see Fig. 3,) caps 16 are provided with flanges 17, which extend around the outer ends of the wheel-hubs 18. Similarly the portions of the wheel-frame A adjacent to the wheel-hubs 18 are provided with flanges 19, which extend about the inner ends of the wheel-hubs.

The driver's seat C is carried upon the upper horizontal member 10 and is preferably for convenience adjustable from front to rear. For this purpose the frame member 10 is provided with a longitudinal slot 20 for a bolt 21, which extends between the seat C and a clamping-piece 22, arranged to engage the lower side of the frame member 10. By loosening the nut 23 upon the lower end of the bolt the seat may be adjusted back and forth and then firmly secured in any position.

A suitable brace connection is provided by which the wheel-frame is securely held in upright position when attached to the harrow and in such a manner that the wheel-frame may move up and down in passing over uneven ground without lifting the harrow and so that it may swivel upon a vertical pivot to trail properly as the team and harrow are turned about. Such a brace connection preferably comprises the upper set of dual divergent brace links or rods D and the lower set of dual divergent brace links or rods D'. The upper set of dual divergent brace-links D are secured at their rear ends by a bolt 24 to a pivot-block 25, which swivels upon a vertical pivot 26, connected to or formed in piece with a horizontal projection 27 at the upper end of the vertical wheel-frame member 12, as clearly shown in detail in Fig. 5. Pivot-block 25 is held against displacement by a bolt 28 passing vertically through the pivot 26 and provided at one end with a washer 29 and nut 30. The lower set of dual divergent brace-links D' are connected by a joint of similar construction to a projection 27', formed upon the wheel-frame at the lower end of the upright member 12. The forward adjacent ends of both the upper and lower sets of brace-links are connected by the horizontal pivot-bolts 31 to the rear ends of the U-shaped coupling-pieces 32. The latter are provided with fastening-bolts 33, having thimbles 34, by which the coupling-pieces are secured to the rear tooth-bar E of the harrow.

In the instance shown the harrow tooth-bars E' are formed of angle-irons, and the thimble-piece 34 is shaped to properly engage the vertical flange of the angle-iron and is cut away, as indicated in Fig. 6, to engage one of the teeth $e$. It will be understood, however, that the thimble-piece 34 may be properly shaped to engage a round tooth-bar or one of any suitable form.

By employing the horizontal pivot connections 31 between the forward ends of the brace-links D D' and the harrow the riding attachment may move up and down as it passes over the ground without lifting the harrow, while the vertical pivot connections between the rear ends of the brace-links and the wheel-frame permit the latter to trail properly as the team and harrow are turned about.

The wheel-frame and wheels are preferably of narrow tread, so that they may readily swivel upon the pivots 26; but the divergent brace-links connected at their forward ends to the harrow firmly hold and brace the riding attachment in its upright position, and the upper and lower sets of brace-links D D', spaced apart at their rear ends and connected to the wheel-frame, serve to take up any sidewise twist in passing over uneven ground. It will be understood, however, that the invention is not limited to the precise form of connecting brace-links shown in the drawings. Other forms of connections could be employed. It is desirable, however, that the brace connection should be horizontally swiveled at its forward end to the harrow and vertically pivoted at its rear end to the wheel-frame. For example, one set of brace-links, if desired, could be omitted. In such case it would be necessary to rigidly connect the rear ends of the retained set of brace-links to the pivot-block 25. Indeed, a single brace connection could be employed, if desired; but for strength and rigidity the arrangement indicated is preferred.

To give additional rigidity to the connection, the forward ends of the upper and lower sets are preferably securely fastened together by a headed rivet or bolt 35.

A scraper-bar F, (see Fig. 7,) provided with scraping-blades $f$ for each of the wheels, is adjustably secured to the rear member 14 of the wheel-frame A by bolts 36, which extend between the scraper-bar and a short piece 37 engaging the opposite side of the frame member 14. The scraper-bar is preferably shaped to conform to the outline of the frame member 14 so that it may be readily secured in adjusted position.

Foot-rests G are provided for the driver and are adjustably secured to either set of the brace-links D D' by bolts 38, which extend vertically through the inner ends of each of the foot-rests and through a fastening-piece 39. The inner ends of the foot-rest G and of the fastening-piece 39 are preferably grooved, as indicated, to firmly engage the upper and lower edges of the brace-links. By this means the foot-rest G may be adjusted in position and fastened to either set of brace-links, as desired.

The form of harrow illustrated is merely for the sake of clearness. It will be understood that the attachment may be connected to any suitable form of toothed harrow, and, indeed, to other similar agricultural implements.

In the form illustrated the tooth-bars E E' of the harrow, of which two only are shown, carry the teeth $e$ and are connected by the usual longitudinal bars H and pivotal links $h$. A central longitudinal bar H' is pivotally connected to upwardly-extending portions of the links $h$, and a shift-lever $H^2$ for varying the angle of the teeth is pivotally connected to the bar H' and to the central longitudinal bar H. The shift-lever $H^2$ is provided with the usual spring-held latch-dog $h^2$, which engages the teeth of the segment $h^3$, fixed to the bar H' and which is actuated by the handle-piece $h^4$, connected thereto by a link $h^5$. In this position it will be seen that the shift-lever $H^2$ extends within easy reach of the driver seated upon the riding attachment. In cases where two or three harrow-sections are connected together it is only necessary to place the operating-lever upon the inner ends of the outside sections in order to be easily reached by the driver. It will also be observed that by connecting the brace-links D D' to the rear ends of the coupling-pieces 32, which are fastened to the tooth-bars, the driver's weight is exerted upon the tooth-bars to hold the teeth in upright position, and thus resist the tendency of the tooth-bars to rock rearwardly as the harrow passes over the ground. Moreover, by employing such a connection the driver's weight is exerted to assist him in raising the teeth to upright position after they have been turned back to pass over trash or for other purposes.

It will be understood that the attachment may be employed with harrows having any suitable form of shift-lever, and the particular one herein set forth is merely shown as an example.

It is obvious that the details of structure herein shown may be widely varied by the skilled mechanic without departure from the features of the invention.

Having described my invention, what I claim as new, and desire to secure by Letters Patent, is—

1. In a riding attachment for harrows or the like, the combination with a harrow-section, of a wheel-frame, a connecting-brace vertically pivoted at its rear end to the front end of said wheel-frame, a coupling horizontally pivoted to the forward end of said connecting-brace and means for detachably securing said coupling directly to a rear bar of said harrow-section.

2. In a riding attachment for harrows or the like, the combination with a wheel-frame and a seat carried thereby, of a connecting-brace vertically pivoted at its rear end to the forward end of said wheel-frame, a coupling having a horizontally-pivoted connection with said brace and means for detachably securing said coupling directly to a rear bar of the harrow-section.

3. In a riding attachment for harrows or the like, the combination with a wheel-frame, of a connecting-brace, a pair of vertical pivots placed one above the other at the forward end of said wheel-frame and in front of said wheels for connecting the rear end of said brace to said wheel-frame and a coupling horizontally pivoted to the forward end of said connecting-brace for engaging the harrow-frame.

4. In a riding attachment for harrows or the like, the combination with a wheel-frame and a seat carried thereby, of dual divergent brace-links vertically pivoted at the rear adjacent ends to the forward end of the wheel-frame, a coupling horizontally pivoted to each one of the forward divergent ends of said brace-links and means for detachably securing said couplings directly to a rear bar of the harrow-frame.

5. In a riding attachment for harrows or the like, the combination with a wheel-frame and a seat carried thereby, of a connecting-brace, a pair of vertical pivots arranged one above the other at the forward end of said wheel-frame for connecting the rear end of said brace thereto, a pair of couplings horizontally pivoted to the forward end of said connecting-brace and means for detachably securing said couplings directly to a rear bar of the harrow-frame.

6. In a riding attachment for harrows or the like, the combination with a narrow vertically-disposed wheel-frame, of a seat mounted directly on said wheel-frame and supporting-wheels journaled to the rear lower portion thereof, of upper and lower sets of dual divergent links vertically pivoted at their rear adjacent ends to the forward end of said wheel-frame and horizontally pivoted at their forward divergent ends to the harrow-frame.

7. In a riding attachment for harrows and the like, the combination with a wheel-frame and a seat carried thereby, of dual divergent brace-links, a vertical pivot fixed to the forward end of said wheel-frame, a pivot-block engaging said pivot and to which the rear adjacent ends of both of said brace-links are secured and couplings for engaging the rear of the harrow-frame having horizontally pivotal connections with the forward divergent ends of said brace-links.

8. In a riding attachment for harrows and the like, the combination with a wheel-frame, of upper and lower brace-links spaced apart and vertically pivoted at their rear ends to the forward end of the wheel-frame, and a common horizontal pivot for connecting the forward ends of said brace-links to the rear of the harrow-frame.

9. In riding attachments for harrows and the like, the combination with a wheel-frame, of upper and lower sets of dual divergent brace-links spaced apart and vertically pivoted at their rear ends to the forward end of the wheel-frame and common pivot-bolts for connecting the forward divergent ends to the harrow-frame.

10. In riding attachments for harrows and the like, the combination with a wheel-frame and a seat carried thereby, of upper and lower sets of dual divergent brace-links, vertical pivots spaced apart upon the forward end of said wheel-frame, pivot-blocks engaging said pivots to which the rear adjacent ends of the separate sets of brace-links are connected, couplings for engaging the rear of the harrow-frame and horizontal pivot-bolts connecting the forward divergent ends of said separate sets of brace-links to said couplings.

11. In a riding attachment for harrows and the like, the combination with a narrow upright wheel-frame having oppositely-projecting journals, of supporting-wheels mounted on said journals on opposite sides of said narrow upright frame, a seat carried by said frame, a brace connection vertically pivoted at its rear end to the forward end of said wheel-frame, a coupling having horizontally-pivoted connections with the forward end of said brace connection and means for securing said coupling to the rear bar of the harrow-frame.

12. In a riding attachment for harrows and the like, the combination with a wheel-frame, of a seat longitudinally adjustable thereon and a brace connection vertically pivoted at its rear end to the forward end of said wheel-frame and having horizontally-pivoted connections for engaging the rear of the harrow-frame.

13. In a riding attachment for harrows and the like, the combination with a wheel-frame, of a connecting-brace vertically pivoted at its rear end to said wheel-frame, a coupling for engaging a rear tooth-bar of the harrow and a horizontally-pivoted connection between the rear end of said coupling and the forward end of said brace connection.

14. In a riding attachment for harrows and the like, the combination with a wheel-frame and a seat carried thereby, of dual divergent brace-links vertically pivoted at their rear adjacent ends to the wheel-frame, couplings for engaging a rear tooth-bar of the harrow-frame, and horizontally-pivoted connections between the rear ends of said couplings and the forward ends of said brace-links.

JOSEPH MANGAN.

Witnesses:
ABRAHAM ANDERSON,
LESTER F. LAWRENCE.